(12) United States Patent
Hurault et al.

(10) Patent No.: US 12,188,451 B2
(45) Date of Patent: *Jan. 7, 2025

(54) NOISE REDUCTION ELEMENT AND A WIND TURBINE BLADE COMPRISING A NOISE REDUCTION ELEMENT

(71) Applicant: LM Wind Power A/S, Kolding (DK)

(72) Inventors: Jeremy Hurault, Eastleigh (GB); Dongke Sun, Eastleigh (GB); Guannan Wang, Salzbergen NI (DE); Jesper Madsen, Kolding (DK); Lars Bo Hansen, Kolding (DK)

(*) Notice: Subject to any disclaimer, the term of this patent is extended or adjusted under 35 U.S.C. 154(b) by 0 days.

This patent is subject to a terminal disclaimer.

(21) Appl. No.: 17/794,071

(22) PCT Filed: Feb. 23, 2021

(86) PCT No.: PCT/EP2021/054453
§ 371 (c)(1),
(2) Date: Jul. 20, 2022

(87) PCT Pub. No.: WO2021/170585
PCT Pub. Date: Sep. 2, 2021

(65) Prior Publication Data
US 2023/0049133 A1     Feb. 16, 2023

(30) Foreign Application Priority Data
Feb. 24, 2020   (GB) ..................................... 2002557

(51) Int. Cl.
*F03D 80/30*     (2016.01)
*F03D 1/06*      (2006.01)
*F03D 7/02*      (2006.01)

(52) U.S. Cl.
CPC ............ *F03D 80/30* (2016.05); *F03D 1/0675* (2013.01); *F03D 1/069* (2023.08); *F03D 7/0296* (2013.01);
(Continued)

(58) Field of Classification Search
CPC ........ F03D 80/30; F03D 1/0675; F03D 1/069; F03D 7/0296; F03D 7/0298; F05B 2260/96; Y02E 10/72
See application file for complete search history.

(56) References Cited

U.S. PATENT DOCUMENTS

2010/0047070 A1    2/2010   Slot et al.
2012/0141277 A1*   6/2012   Yarbrough .............. F03D 80/30
                                                    416/146 R
(Continued)

FOREIGN PATENT DOCUMENTS

WO    WO-2012071679 A1 *  6/2012    ............ F01D 25/00
WO        2019015731 A1    1/2019

*Primary Examiner* — Brandon D Lee
(74) *Attorney, Agent, or Firm* — Nath, Goldberg & Meyer; Jerald L. Meyer; Tanya E. Harkins

(57) ABSTRACT

A noise reduction element extends between a first end and a second end in a first direction. The noise reduction element extends between a third end and a fourth end in a second direction perpendicular to the first direction. The noise reduction element includes a base part configured to be attached to a trailing edge of a wind turbine blade. The base part has a first base part surface and a second base part surface. The base part extends between the first end and a first position in the first direction. The noise reduction element includes a first serration part having a serration pressure surface and a serration suction surface and extending in the first direction between the first position and the second end. The first serration part has a thickness in a third direction between the serration pressure surface and the serration suction surface.

20 Claims, 8 Drawing Sheets

(52) U.S. Cl.
CPC ........ *F03D 7/0298* (2023.08); *F05B 2260/96* (2013.01)

(56) References Cited

U.S. PATENT DOCUMENTS

2019/0316565 A1* 10/2019 Wang .................... F03D 1/0633
2020/0072185 A1* 3/2020 Wang .................... F04D 29/667

* cited by examiner

NOISE REDUCTION ELEMENT AND A WIND TURBINE BLADE COMPRISING A NOISE REDUCTION ELEMENT

This is a National Phase Application filed under 35 U.S.C. 371 as a national stage of PCT/EP2021/054453, filed Feb. 23, 2021, an application claiming the benefit of Great Britain Application No. 2002557.3, filed Feb. 24, 2020, the content of each of which is hereby incorporated by reference in its entirety.

The present disclosure relates to a noise reduction element and a wind turbine blade comprising a noise reduction element. More specifically, the present disclosure pertains to the field of lightning protection of wind turbine blades and reduction of noise caused by operation of a wind turbine blade.

BACKGROUND

Wind turbines may create noise during operation, which may be disturbing for the nearby environment. Serrations on the trailing edge of the wind turbine blade has been found to reduce noise during operation, however finding the optimal shape of the serrations is an ongoing challenge.

Furthermore, wind turbine blades installed in the field may be subject to storms and lighting strikes. Thus, there is a need to protect wind turbine blades from potential lighting strikes, e.g. by providing lightning receptors on the wind turbine blades. The receptors may be provided in the shell of the wind turbine blade or they may extend from and/or beyond the surface of the wind turbine blade. In the case where the receptor is embedded in the shell the aerodynamic properties of the wind turbine blade is preserved at a larger extent than if the receptor extends from the surface of the wind turbine blade. In any case the aerodynamic properties of the wind turbine blade need to be assessed and optimized when designing the lighting protection system.

SUMMARY OF THE INVENTION

It is an object of the present disclosure to provide a noise reduction element and a wind turbine blade comprising a noise reduction element, which overcomes at least some of the disadvantages of the prior art.

Furthermore, it is an object of the present invention to provide for enhanced lightning protection of the wind turbine blade, protecting the wind turbine blade from lightning strikes.

Thus, the present invention relates to a noise reduction element for a wind turbine blade. The noise reduction element extends between a first end and a second end in a first direction. The noise reduction element extends between a third end and a fourth end in a second direction perpendicular to the first direction. The noise reduction element comprises a base part configured to be attached to a wind turbine blade, e.g. the trailing edge of a wind turbine blade. The base part has a first base part surface and a second base part surface. The base part extends between the first end and a first position in the first direction.

The noise reduction element comprises a first serration part extending in the first direction between the first position and the second end. The first serration part comprises a serration pressure surface and a serration suction surface. The first serration part has a thickness in a third direction between the serration pressure surface and the serration suction surface. The thickness of the first serration part varies along the first direction. The first serration part has a width in the second direction between a first intersection between the serration pressure surface and the serration suction surface and a second intersection between the serration pressure surface and the serration suction surface. At least a part of the first serration part, such as the entire first serration part or a part of the first serration part, is electrically conductive and configured to attract and conduct lightning current to ground.

The serration pressure surface of the first serration part may be convex. The serration suction surface of the first serration part may be convex. The serration pressure surface and the serration suction surface of the first serration part may be adjoined at the first intersection and/or the second intersection of the first serration part. The serration pressure surface and the serration suction surface may form the outer surface of the first serration part.

Also disclosed is a wind turbine blade assembly comprising a wind turbine blade extending in a longitudinal direction from a blade tip to a blade root and having a pressure side, a suction side, a leading edge and a trailing edge.

The wind turbine blade assembly comprises a first noise reduction element, such as the noise reduction element as described above. The first noise reduction element extends beyond the trailing edge of the wind turbine blade. The first noise reduction element extends between a first end and a second end in a first direction. The first noise reduction element extends between a third end and a fourth end in a second direction perpendicular to the first direction.

The first noise reduction element comprises a base part being attached to the wind turbine blade, e.g. the trailing edge of a wind turbine blade. The base part has a first base part surface and a second base part surface and extending between the first end and a first position in the first direction.

The first noise reduction element comprises a first serration part extending in the first direction between the first position, such as a primary first position, and the second end. The first serration part comprises a serration pressure surface and a serration suction surface. The first serration part has a thickness in a third direction between the serration pressure surface and the serration suction surface. The thickness of the first serration part varies along the first direction. The first serration part has a width in the second direction between a first intersection between the serration pressure surface and the serration suction surface and a second intersection between the serration pressure surface and the serration suction surface. At least a part of the first serration part, such as the entire first serration part or a part of the first serration part, is electrically conductive and configured to attract and conduct lightning current to ground.

The serration pressure surface of the first serration part may be convex. The serration suction surface of the first serration part may be convex. The serration pressure surface and the serration suction surface of the first serration part may be adjoined at the first intersection and/or the second intersection of the first serration part. The serration pressure surface and the serration suction surface may form the outer surface of the first serration part.

It is an advantage of the present disclosure that an improved noise reduction element is provided, which may reduce noise caused by the operation of the wind turbine blade while also protecting against lightning strikes. Thus, the design of the wind turbine blade may be simplified, leading to a simpler manufacturing process and reduced manufacturing cost. Furthermore, the shape of the disclosed serrations has been found to improve the noise reduction during operation and also withstand the impact of a potential lightning strike. Also, the present disclosure provides for lightning receptors, with little or no negative impact on the aerodynamic properties of the wind turbine blade.

The noise reduction element may comprise a plurality of serration parts, including the first serration part and a second serration part. The second serration part may extend in the first direction between the first position, such as a secondary first position, and the second end. The second serration part may comprise a serration pressure surface and a serration suction surface. The second serration part may have a thickness in the third direction between the serration pressure surface and the serration suction surface of the second serration part. The second serration part may have a width in the second direction between a first intersection between the serration pressure surface and the serration suction surface of the second serration part and a second intersection between the serration pressure surface and the serration suction surface of the second serration part.

The serration pressure surface of the second serration part may be convex. The serration suction surface of the second serration part may be convex. The serration pressure surface and the serration suction surface of the second serration part may be adjoined at the first intersection and/or the second intersection of the second serration part. The serration pressure surface and the serration suction surface may form the outer surface of the second serration part.

The first direction of the noise reduction element may be parallel to a chordwise direction of the wind turbine blade, when the noise reduction element is attached to the wind turbine blade. The second direction of the noise reduction element may be parallel to the longitudinal direction, or spanwise direction, of the wind turbine blade, when the noise reduction element is attached to the wind turbine blade.

The first serration part may extend at a primary position along the second direction. The second serration part may extend at a secondary position along the second direction. The primary position and the secondary position may be separated along the second direction, e.g. by a first separation distance. The first separation distance may be substantially the same as a maximum width of the first serration part and/or the second serration part.

The first serration part may comprise a serration tip part extending in the first direction between a second position and the second end. The first serration part may comprise a serration root part extending in the first direction from the first position to the second position. The second serration part may comprise a serration tip part extending in the first direction between a secondary second position and the second end. The second serration part may comprise a serration root part extending in the first direction from the secondary first position to the secondary second position. The serration tip part of the first serration part and/or of the second serration part may have a conical shape.

At least part of the first serration part and/or the second serration part, such as the serration tip part of the first serration part and/or of the second serration part, may be formed from an electrically conductive material, such as graphite or metal. Thus, the serration tip part may be electrically conductive and configured to attract and conduct lightning current to ground. The first serration part and/or the second serration part may be connected, or configured to be connected, to ground, e.g. through one or more conductive elements, such as a down conductor. The first serration part and/or the second serration part may be connected to a down conductor of the wind turbine blade configured to conduct lightning current to ground.

The plurality of serration parts, including the first serration part and the second serration part may be electrically conductive and configured to attract and conduct lightning current to ground. Alternatively, one or more of the plurality of serration parts, e.g. the first serration part, may be electrically conductive and configured to attract and conduct lightning current to ground, while others of the plurality of serration parts, e.g. the second serration part may be non-conductive. For example, the serration tip part of the second serration part may be non-conductive, e.g. may be made of a plastic material.

The first serration part and/or the second serration part may comprise an internal conductor extending in the first direction and configured to conduct lightning current through at least a portion of the respective first serration part and/or second serration part, such as through the serration root part of the respective first serration part and/or second serration part. The internal conductor may extend between the first position and the second position. For example, the internal conductor of the first serration part may extend between the first position and the second position. The internal conductor of the second serration part may extend between the secondary first position and the secondary second position. The internal conductor may form an electrical connection between the serration tip part and a down conductor of the wind turbine blade. The internal conductor may be made of an electrically conductive material. The internal conductor may be attached to the inner surface of the respective first serration part and/or second serration part. The internal conductor may be embedded in the serration pressure surface or the serration suction surface of the respective first serration part and/or second serration part.

The serration root part(s) and/or the base part may be formed from a plastic material, such as a polymer and/or a composite material, such as thermoplastic, glass fiber reinforced thermoplastic or any combination thereof.

At least a portion of the first serration part and/or the second serration part may be hollow. For example, the serration root part may be hollow. The hollow part may be manufactured by casting or moulding.

The distance between the second position and the second end, e.g. the length of the serration tip part of the first serration part, may be at least 20% of the distance between the first position and the second end, e.g. the length of the first serration part, such as at least 30% of the distance between the first position and the second end, such as at least 50% of the distance between the first position and the second end. The distance between the secondary second position and the second end, e.g. the length of the serration tip part of the second serration part, may be at least 20% of the distance between the secondary first position and the second end, e.g. the length of the second serration part, such as at least 30% of the distance between the secondary first position and the second end, such as at least 50% of the distance between the secondary first position and the second end.

The width of at least a part of the first serration part and/or of at least a part of the second serration part may decrease along the first direction. The width of the first serration part may decrease from a third position to a fourth position along the first direction. The third position may be the first position. The fourth position may be the second end. The width of the second serration part may decrease from a secondary third position to a secondary fourth position along the first direction. The secondary third position may be the secondary first position. The secondary fourth position may be the second end.

The thickness of the first serration part may vary, e.g. decrease and/or increase, from a fifth position to a sixth position along the first direction. The fifth position may be the first position and/or the third position. The sixth position may be the second end and/or the fourth position. The thickness of the first serration part may increase from the fifth position to a position between the fifth position and the sixth position, e.g. a tenth position. The thickness of the first serration part may decrease from a position between the fifth position and the sixth position, e.g. the tenth position, to the sixth position. The thickness of the second serration part may vary, e.g. decrease and/or increase, from a secondary fifth position to a secondary sixth position along the first direction. The secondary fifth position may be the secondary first position and/or the secondary third position. The secondary sixth position may be the second end and/or the secondary fourth position. The thickness of the second serration part may increase from the secondary fifth position to a position between the secondary fifth position and the secondary sixth position, e.g. a secondary tenth position. The thickness of the second serration part may decrease from a position between the secondary fifth position and the secondary sixth position, e.g. the secondary tenth position, to the secondary sixth position.

Along a part of the first direction, the width of a serration part may be larger than the thickness of the serration part. The width of the first serration part may be larger than the thickness of the first serration part between the first position and a seventh position, e.g. the cross-section of the first serration part between the first position and the seventh position may have an elliptical shape. The seventh position may be the second position. The width of the second serration part may be larger than the thickness of the second serration part between the secondary first position and a secondary seventh position, e.g. the cross-section of the second serration part between the secondary first position and the secondary seventh position may have an elliptical shape. The secondary seventh position may be the secondary second position.

Along a part of the first direction, the width of a serration part may be the same as the thickness of the serration part. The width of the first serration part may be the same as the thickness of the first serration part between an eighth position and the second end, e.g. the cross-section of the first serration part between the eighth position and the second end may have a circular shape. The first serration part may have a conical shape between the eighth position and the second end. The width of the second serration part may be the same as the thickness of the second serration part between a secondary eighth position and the second end, e.g. the cross-section of the second serration part between the secondary eighth position and the second end may have a circular shape. The second serration part may have a conical shape between the secondary eighth position and the second end.

At a ninth position along the first direction, a maximum distance along the third direction between the serration pressure surface and a plane between the first intersection and the second intersection, e.g. of the first serration part, may be different, e.g. larger, than a maximum distance along the third direction between the serration suction surface and the plane between the first intersection and the second intersection. At a secondary ninth position along the first direction, a maximum distance along the third direction between the serration pressure surface and a plane between the first intersection and the second intersection, e.g. of the second serration part, may be different, e.g. larger, than a maximum distance along the third direction between the serration suction surface and the plane between the first intersection and the second intersection.

The distance between the first position and the second end, e.g. the length of the first serration part, may be between 10%-30% of the local chord of the wind turbine blade, such as 20%. The distance between the secondary first position and the second end, e.g. the length of the second serration part, may be between 10%-30% of the local chord of the wind turbine blade, such as 20%.

The width of the first serration part at the second position may be between 2%-7% of the local chord of the wind turbine blade, such as 5%, such as more than 8 mm, such as more than 14 mm, such as around 2.5 cm, such as more than 40 mm. The width of the second serration part at the secondary second position may be between 2%-7% of the local chord of the wind turbine blade, such as 5%, such as more than 8 mm, such as more than 14 mm, such as around 2.5 cm, such as more than 40 mm.

The thickness of the first serration part at the second position may be between 2%-7% of the local chord of the wind turbine blade, such as 5%, such as more than 8 mm, such as more than 14 mm, such as around 25 mm, such as more than 40 mm. The thickness of the second serration part at the secondary second position may be between 2%-7% of the local chord of the wind turbine blade, such as 5%, such as more than 8 mm, such as more than 14 mm, such as around 25 mm, such as more than 40 mm.

The shape, thickness and width of the first serration part and or the second serration part allow improved noise reduction performance. Further, the described electrically conductive part of the first serration part or the electrically conductive part of the second serration part may comprise the necessary thickness and width to withstand being struck by lightning, e.g. the area of the cross section of the electrically conductive part may be at least 35 mm2, such as at least 50 mm2, such as at least 70 mm2, such as at least 1250 mm2. A serration part with a too small thickness, width or cross-sectional area could potentially melt or disintegrate when struck by lightning. The first position may be the secondary first position. The second position may be the secondary second position. The third position may be the secondary third position. The fourth position may be the secondary fourth position. The fifth position may be the secondary fifth position. The sixth position may be the secondary sixth position. The seventh position may be the secondary seventh position. The eighth position may be the secondary eight position. The ninth position may be the secondary ninth position. The tenth position may be the secondary tenth position.

The thickness between the first base part surface and the second base part surface may decrease along the first direction towards the first end, e.g. the cross-section of the base part may be tapered towards the first end. The tapered shape of the base part provides for a smooth transition to the surface of the wind turbine blade to preserve the aerodynamic properties of the surface of the wind turbine blade.

The first base part surface and the serration suction surface, e.g. of the first serration part and/or the second serration part, may be adjoined. For example, the first base part surface and the serration suction surface, e.g. of the first serration part and/or the second serration part, may form a common surface, such as a common suction surface, of the noise reduction element. The second base part surface and the serration pressure surface, e.g. of the first serration part and/or the second serration part, may be are adjoined. For example, the second base part surface and the serration pressure surface, e.g. of the first serration part and/or the second serration part, may form a common surface, such as a common pressure surface, of the noise reduction element.

The base part may comprise a conductive path extending along the second direction and being electrically connected to the first serration part and/or the second serration part. The conductive path may be configured to conduct lightning current to ground. The conductive path may be made of an electrically conductive material. The conductive path may be embedded in the base part.

The wind turbine blade assembly may comprise a plurality of noise reduction elements, including the first noise reduction element and a second noise reduction element. Each of the plurality of noise reduction element, such as the first noise reduction element and/or the second noise reduction element may be as the noise reduction element as described above.

The plurality of noise reduction elements may be distributed along the trailing edge of the wind turbine blade. The plurality of noise reduction elements may be distributed along at least 30% of the length of the trailing edge starting from the tip, such as at least 50% of the length, such as at least 70% of the length. The plurality of noise reduction elements may be distributed abutting each other. The plurality of noise reduction elements may be distributed spaced apart.

The plurality of noise reduction elements may be distributed along less than 70% of the length of the trailing edge starting from the tip, such as less than 50% of the length, such as less than 30% of the length.

The plurality of noise reduction elements may be distributed along 20-80% of the length of the trailing edge starting from the tip, such as along 30-70% of the length, such as along 40-60% of the length.

The plurality of noise reduction elements, including the first noise reduction element and the second noise reduction element may comprise serration parts being electrically conductive and configured to attract and conduct lightning current to ground. Alternatively, one or more of the plurality of noise reduction elements, e.g. the first noise reduction element, may comprise serration part(s) being electrically conductive and configured to attract and conduct lightning current to ground, while others of the plurality of noise reduction elements, e.g. the second noise reduction element, may comprise non-conductive serration part(s). Noise reduction element comprising serration part(s) being electrically conductive and being configured to attract and conduct lightning current to ground may be positioned at specific positions along the length of the blade, while noise reduction elements comprising non-conductive serration part(s) may be positioned at other positions.

The base part of the first noise reduction element may comprise a conductive path extending along the second direction and being electrically connected to the first serration part and/or the second serration part of the first noise reduction element. The base part of the second noise reduction element may comprise a conductive path extending along the second direction and being electrically connected to the first serration part and/or the second serration part of the second noise reduction element. The conductive path of the first noise reduction element and/or the second noise reduction element may be configured to conduct lightning current to ground. The conductive path may be connected to the down conductor of the wind turbine blade. The internal conductor of the first serration part and/or the second serration part may be connected to the conductive path.

The wind turbine blade assembly may comprise a plurality of conductive paths, e.g. the base part of each noise reduction element may comprise a conductive path, e.g. the base part of the first noise reduction element may comprise a first conductive path and the base part of the second noise reduction element may comprise a second conductive path. The conductive paths may be separated to facilitate a spark gap between the first conductive path of the first noise reduction element and the second conductive path of the second noise reduction element.

The wind turbine blade assembly may comprise a lightning diverter, e.g. a lightning diverter strip. The lightning diverter may extend over the surface, such as the surface of the pressure side and/or the surface of the suction side of the wind turbine blade from the first serration part and/or the second serration part, e.g. of the first noise reduction element and/or the second noise reduction element, towards the leading edge in the transverse direction of the wind turbine blade.

Also disclosed is a method for lightning protecting a wind turbine blade and reducing noise caused by operation of a wind turbine comprising the wind turbine blade. The method comprises providing the wind turbine blade extending in a longitudinal direction from a blade root to a blade tip and having a pressure side, a suction side, a leading edge and a trailing edge.

A first noise reduction element is provided, such as the noise reduction element as described above. The first noise reduction element extends between a first end and a second end in a first direction. The first noise reduction element extends between a third end and a fourth end in a second direction perpendicular to the first direction. The first noise reduction element comprises a base part having a first base part surface and a second base part surface and extending between the first end and a first position in the first direction. The first noise reduction element comprises a first serration part extending in the first direction between the first position and the second end and comprising a serration pressure surface and a serration suction surface. The first serration part has a thickness in a third direction between the serration pressure surface and the serration suction surface. The thickness of the first serration part varies along the first direction. The first serration part has a width in the second direction between a first intersection between the serration pressure surface and the serration suction surface and a second intersection between the serration pressure surface and the serration suction surface. At least a part of the first serration part, such as the entire first serration part or a part of the first serration part, is electrically conductive and configured to attract and conduct lightning to ground.

The first noise reduction element is attached to the trailing edge of the wind turbine blade.

The first base part surface of the first noise reduction element may be attached to the wind turbine blade, such as a surface of the wind turbine blade. Alternatively, the second base part surface of the first noise reduction element may be attached to the wind turbine blade, such as to the surface of the wind turbine blade.

An adhesive may be applied between the first base part surface, e.g. of the first noise reduction element, and the surface of the wind turbine blade. For example, an adhesive may be applied on the first base part surface, e.g. of the first noise reduction element, and/or on the surface of the wind turbine blade near the trailing edge.

The first noise reduction element may be attached to the pressure side of the wind turbine blade. The first base part surface, e.g. of the first noise reduction element, may be attached to the pressure side of the wind turbine blade. Alternatively, the first noise reduction element may be attached to the suction side of the wind turbine blade, e.g. by attaching the second base part surface to the suction side of the wind turbine blade.

The method may comprise providing and attaching further noise reduction elements, such as a second noise reduction element, similarly to the first noise reduction element as described.

It is envisaged that any embodiments or elements as described in connection with any one aspect may be used with any other aspects or embodiments, mutatis mutandis.

BRIEF DESCRIPTION OF THE FIGURES

Embodiments of the invention will be described in more detail in the following with regard to the accompanying figures. Like reference numerals refer to like elements throughout. Like elements may, thus, not be described in detail with respect to the description of each figure. The figures show one way of implementing the present invention and are not to be construed as being limiting to other possible embodiments falling within the scope of the attached claim set. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

DETAILED DESCRIPTION

In the following figure description, the same reference numbers refer to the same elements and may thus not be described in relation to all figures.

Figure 1:
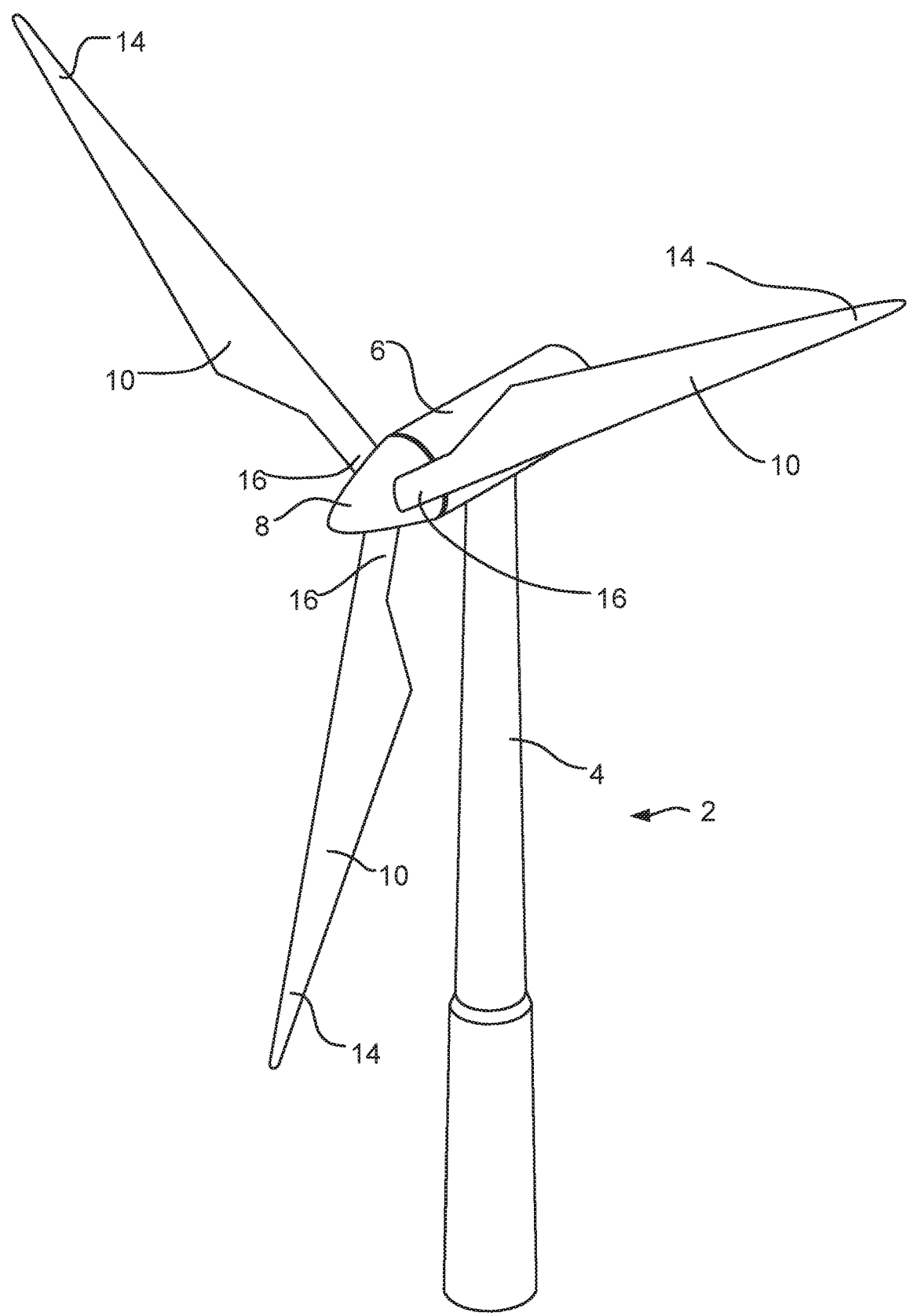
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
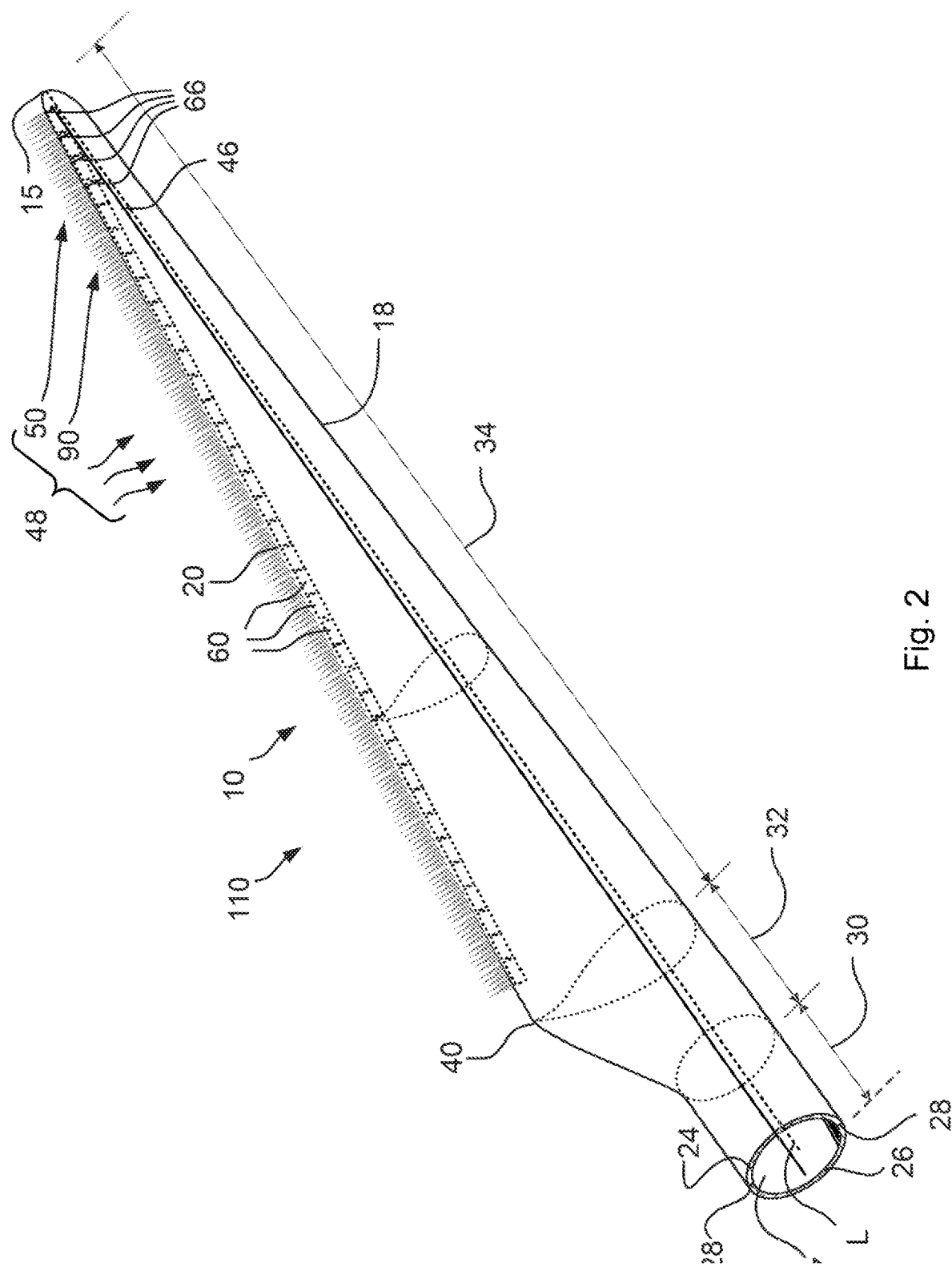
FIG. 2 is a schematic diagram illustrating an exemplary wind turbine blade assembly.

FIG. 2 shows a schematic view of an exemplary wind turbine blade assembly 110. The wind turbine blade assembly 110 comprises a wind turbine blade 10 having the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts or half shells, a first blade shell part 24 and a second blade shell part 26, typically made of fibre-reinforced polymer. The wind turbine blade 10 may comprise additional shell parts, such as a third shell part and/or a fourth shell part. The first blade shell part 24 is typically a pressure side or upwind blade shell part. The second blade shell part 26 is typically a suction side or downwind blade shell part. The first blade shell part 24 and the second blade shell part 26 are fastened together with adhesive, such as glue, along bond lines or glue joints 28 extending along the trailing edge 20 and the leading edge 18 of the blade 10. Typically, the root ends of the blade shell parts 24, 26 has a semi-circular or semi-oval outer cross-sectional shape.

The wind turbine blade assembly 110 comprises a plurality of noise reduction elements 48, e.g. including a first noise reduction element 50 and a second noise reduction element 90, attached and distributed along the trailing edge 20 of the wind turbine blade 10. The first noise reduction element 50 comprises a first serration part being electrically conductive and configured to attract and conduct lightning current to ground. The first serration part may be connected to a down conductor 46 of the wind turbine blade 10 configured to conduct lightning current to ground, e.g. the first serration part may comprise an internal conductor 66 connected top the down conductor 46 and being configured to conduct lightning current through the first serration part to the down conductor 46.

Each of the plurality of noise reduction elements 48 comprises a base part 60. The base part 60 of each of the plurality of noise reduction elements 48 may be attached to the trailing edge 20 of the wind turbine blade, such as to the suction side 26 or pressure side 24 near the trailing edge 20. The plurality of noise reduction elements 48 may be distributed along the entire length of the trailing edge 20, or the plurality of noise reduction elements 48 may be distributed along part of the length of the trailing edge 20 starting from the tip 15.

Figure 3:
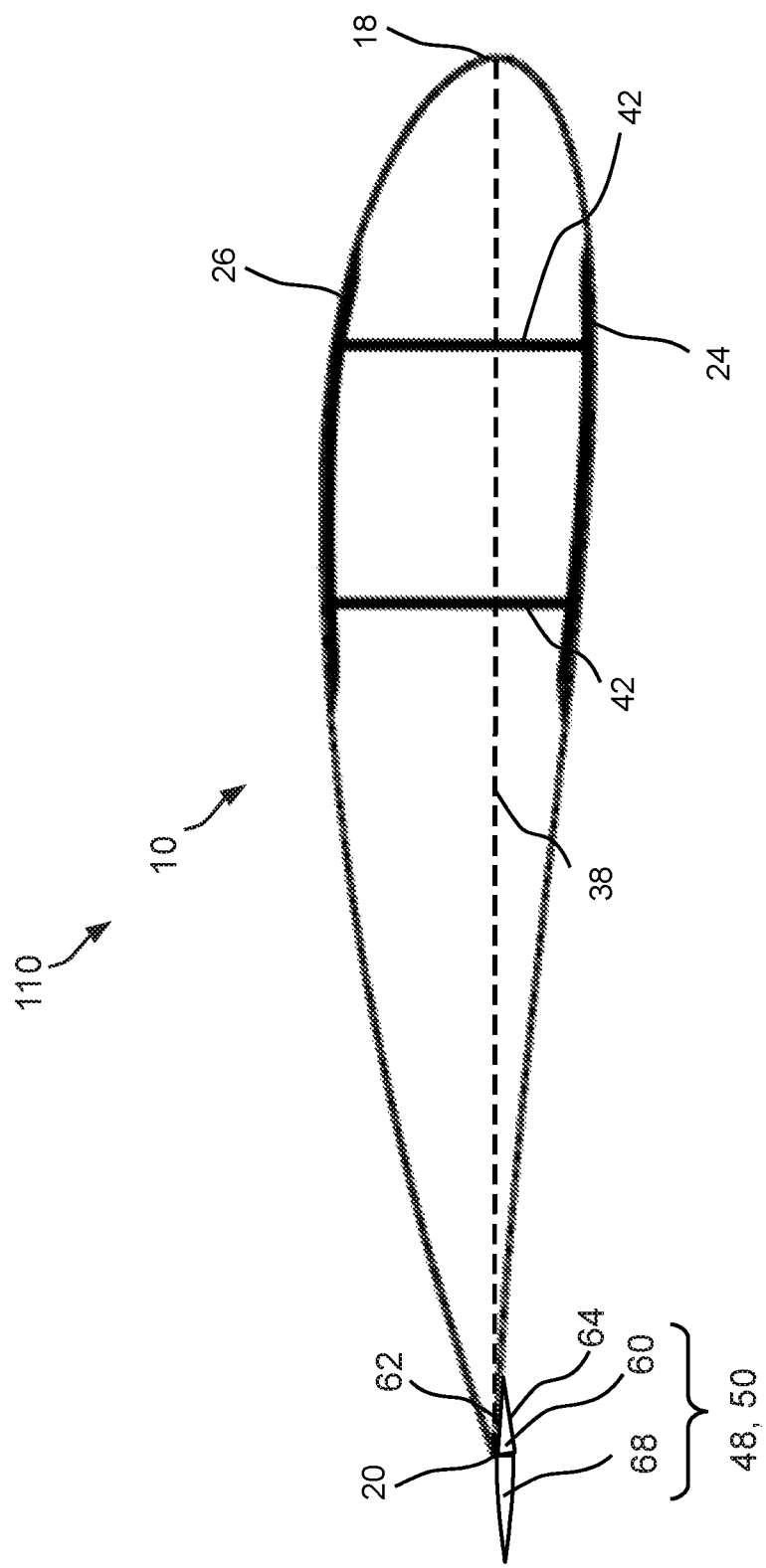
FIG. 3 is a schematic diagram illustrating an exemplary wind turbine blade assembly.

FIG. 3 is a schematic diagram illustrating a cross sectional view of an exemplary wind turbine blade assembly 110, e.g. a cross sectional view of the airfoil region of the wind turbine blade assembly 110. The wind turbine blade assembly 110 comprises a wind turbine blade 10 comprising a leading edge 18, a trailing edge 20, a pressure side 24 and a suction side 26. The wind turbine blade 10 comprises a chord line 38 between the leading edge 18 and the trailing edge 20. The wind turbine blade 10 comprises shear webs 42, such as a leading edge shear web and a trailing edge shear web. The shear webs 42 could alternatively be a spar box with spar sides, such as a trailing edge spar side and a leading edge spar side. The shell parts 24, 26 may comprise glass fibres.

The wind turbine blade assembly 110 comprises a noise reduction element 48, such as a first noise reduction element 50. The noise reduction element 48, 50 comprises a base part 60 and a serration part 68, such as a first serration part. The base part 60 comprises a first base part surface 62 and a second base part surface 64. The noise reduction element 48, 50 may be attached to the wind turbine blade by, for example, attaching the first base part surface 62 to the wind turbine blade 10. The first base part surface 62 may be attached to a surface of the trailing edge 20, e.g. on the pressure side 24 of the trailing edge 20, as illustrated. The noise reduction element 48, 50 may be attached by applying adhesive between the first base part surface 62 and the surface of the wind turbine blade, e.g. by applying an adhesive on the first base part surface 62 and/or on the surface of the wind turbine blade near the trailing edge 20.

Figure 4A:
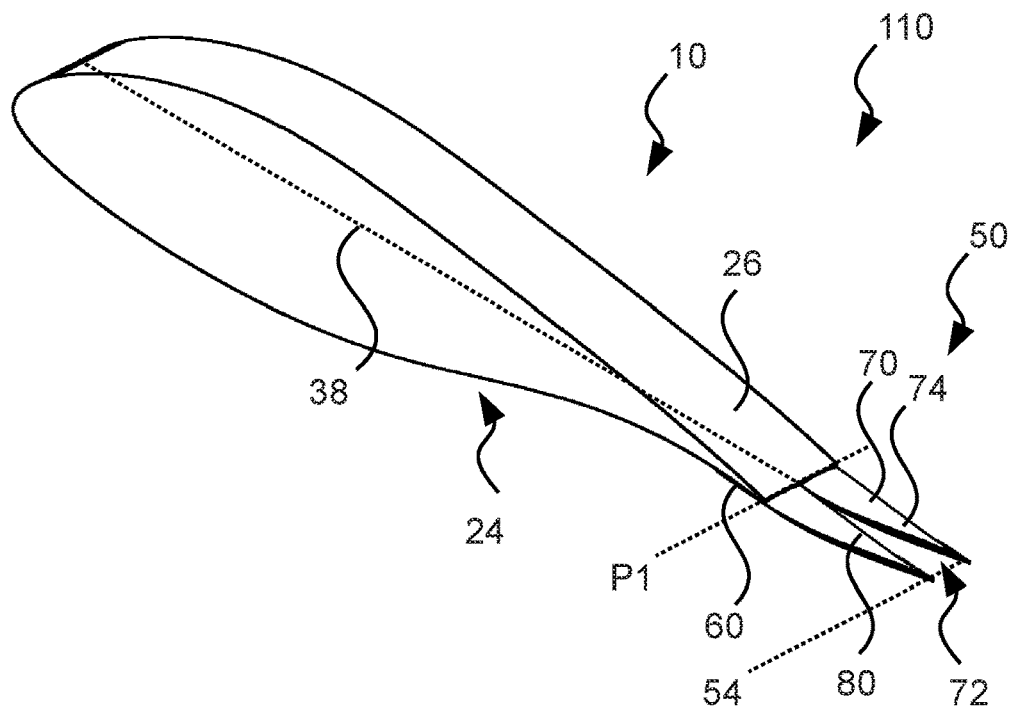
FIGS. 4a-4b are schematic diagrams illustrating an exemplary wind turbine blade assembly.
Figure 4B:
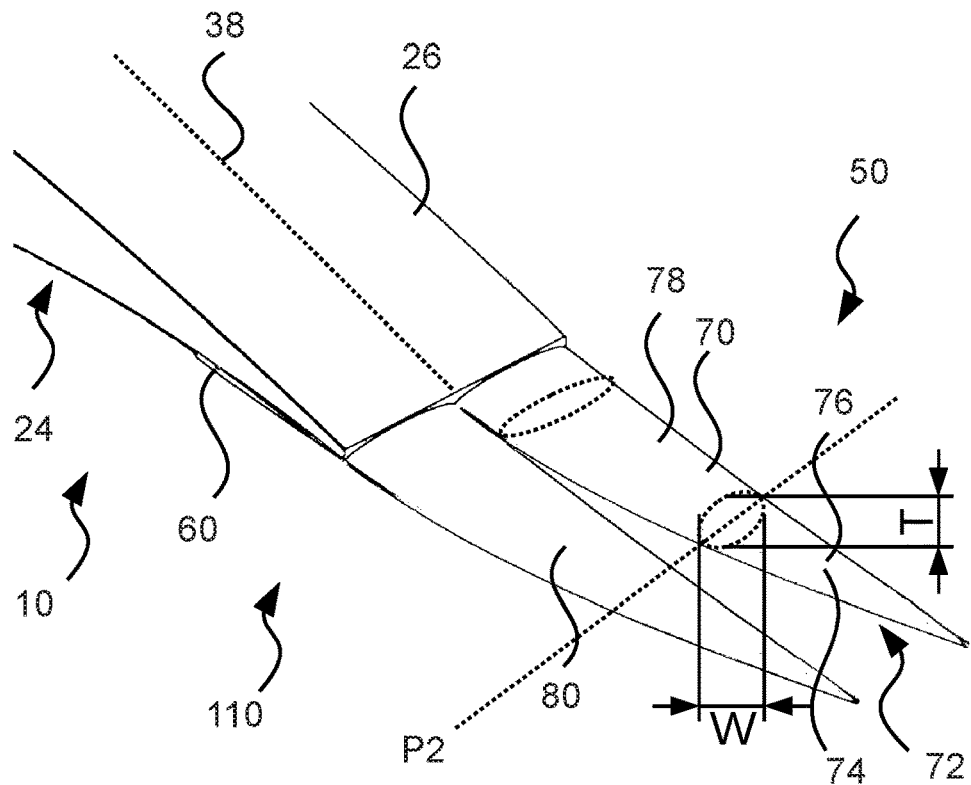

FIGS. 4a-4b are schematic diagrams illustrating an exemplary wind turbine blade assembly 110 comprising a first noise reduction element 50, attached to a wind turbine blade 10. The first noise reduction element 50 comprises a base part 60, a first serration part 70 and a second serration part 80. The first serration part 70 comprises a serration pressure surface 72 and a serration suction surface 74. The first serration part 70 extends between a first position P1 and a second end 54 along a first direction. The first noise reduction element 50 is attached to the wind turbine blade 10 at the trailing edge 20, e.g. on the pressure side 24.

The length of the first serration part, e.g. the distance between the first position P1 and the second end 54 of the first noise reduction element 50, may be between 10%-30% of the local chord 38 of the wind turbine blade 10, such as 20%. The width W at a second position P2 along the first direction of the first serration part 70 may be between 2%-7% of the local chord 38 of the wind turbine blade 10, such as 5%. The thickness T at the second position P2 of the first serration part 70 may be between 2%-7% of the local chord 38 of the wind turbine blade 10, such as 5%. The thickness T and the width W may correspond to approximately 2.5 cm near the tip 15 of the wind turbine blade 10.

Figure 5:
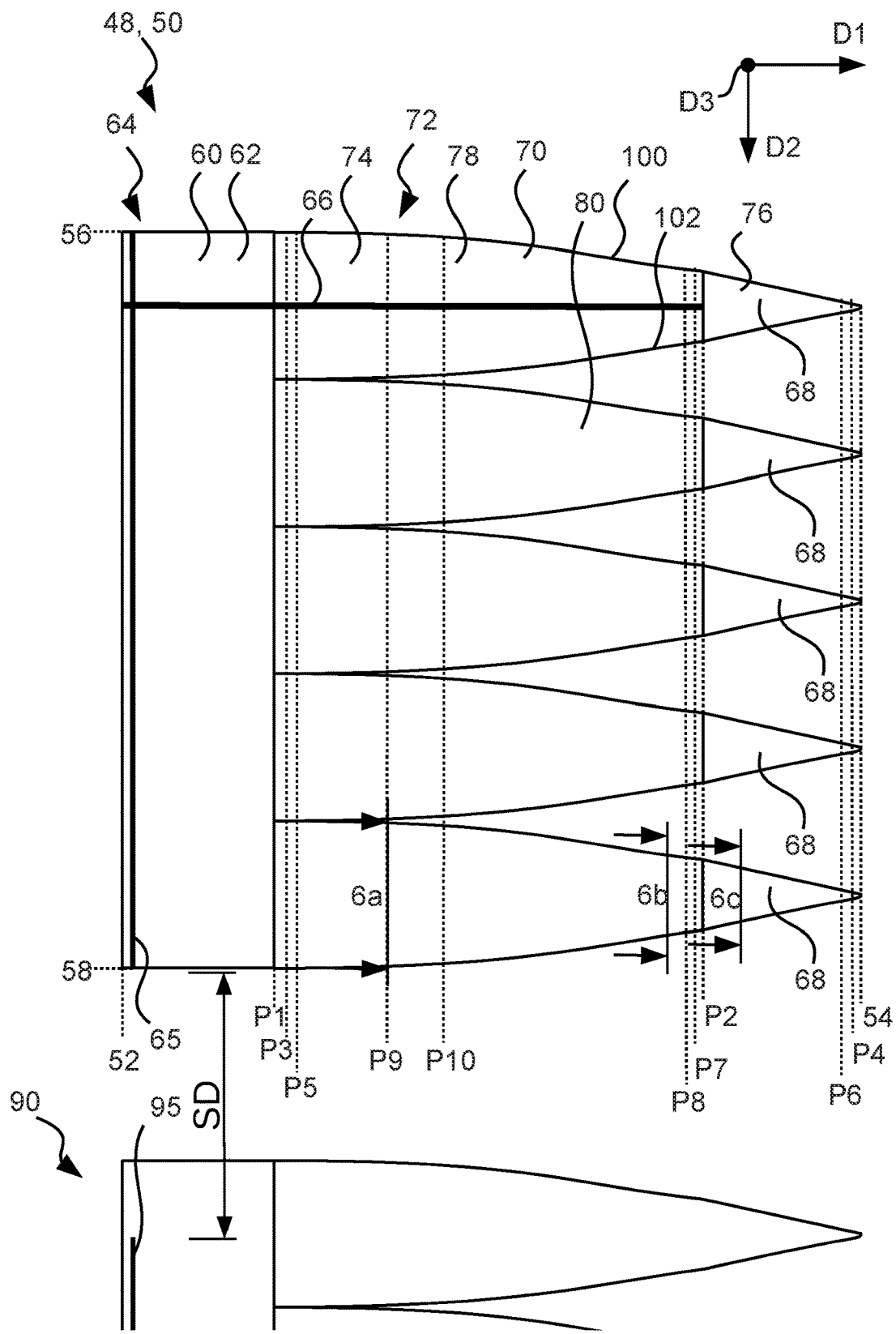
FIG. 5 is a schematic diagram illustrating an exemplary noise reduction element.

FIG. 5 is a schematic diagram illustrating an exemplary noise reduction element 48, such as the first noise reduction element 50, such as the noise reduction element 50 as described with respect to FIGS. 4a-4b. The noise reduction element 48, 50 extends between a first end 52 and a second end 54 in a first direction D1 and extends between a third end 56 and a fourth end 58 in a second direction D2. The first direction D1 and the second direction D2 are perpendicular.

The noise reduction element comprises a base part 60 configured to be attached to a wind turbine blade, e.g. the trailing edge of a wind turbine blade. The base part 60 extends between the first end 52 and a first position P1 in the first direction D1. The base part 60 comprises a first base part surface 62 and a second base part surface 64.

The noise reduction element 48, 50 comprises a first serration part 70 extending between the first position P1 and the second end 54 in the first direction D1. The first serration part 70 comprises a serration suction surface 74 and a serration pressure surface 72.

The noise reduction element 48, 50 may comprise a plurality of serration parts 68, e.g. five serration parts 68, including the first serration part 70 and a second serration part 80. The first serration part 70 may be electrically conductive and configured to attract and conduct lightning current to ground. The second serration part 80 may be electrically conductive and configured to attract and conduct lightning current to ground. The first serration part 70 and the second serration part 80 may both be electrically conductive and configured to attract and conduct lightning current to ground, or, as illustrated, only one of the first serration part 70 and the second serration part 80 may be electrically conductive and configured to attract and conduct lightning current to ground. A serration part not configured to attract lightning may be formed entirely of a plastic material, such as a polymer and/or a composite material, such as thermoplastic, glass fiber reinforced thermoplastic or any combination thereof. The first serration part 70 may be electrically conductive and the other serration parts 68 of the plurality of serration parts may be formed of a plastic material.

The first serration part 70 may comprise a serration tip part 76 extending in the first direction D1 between a second position P2 and the second end 54. The first serration part 70 may comprise a serration root part 78 extending in the first direction D1 from the first position P1 to the second position P2. The serration tip part 76 may be fixedly attached to the serration root part 78, e.g. with bolt, screws or adhesive. Part of the first serration part 70, such as the serration tip part 76, may be formed from an electrically conductive material, such as graphite or metal. The serration root part 78 may be formed from a plastic material, such as a polymer and/or a composite material, such as thermoplastic, glass fiber reinforced thermoplastic or any combination thereof. Part of the first serration part 70, such as the serration root part 78, may be hollow. The hollow part may be provided by for example casting or moulding. The first serration part 70 may comprise an internal conductor 66 configured to conduct lightning current through the first serration part 70. The internal conductor 66 may extend in the first direction D1, e.g. between the first end 52 and the second position P2. The length of the serration tip part 76, e.g. the distance between the second position P2 and the second end 54, may be at least 20% of the length of the first serration part 70. For example, the length of the serration tip part 76 may be at least 30% of the length of the first serration part 70, such as at least 50%.

The first serration part 70 has a thickness in a third direction D3, the third direction being perpendicular to the second direction D2 and the first direction D1. The first serration part 70 has a width in the second direction D2 between a first intersection 100 between the serration pressure surface 72 and the serration suction surface 74 and a second intersection 102 between the serration pressure surface 72 and the serration suction surface 74.

The width of the first serration part may vary, e.g. decrease, from a third position P3 to a fourth position P4 along the first direction D1. The third position P3 may be the first position P1. The fourth position P4 may be the second end 54.

The thickness may vary along the first direction D1, e.g. increase and/or decrease, from a fifth position P5 to a sixth position P6. The fifth position P5 may be the first position P1 and/or the third position P3. The sixth position P6 may be the second end 54 and/or the fourth position P4. The thickness may increase from the fifth position P5 to a position between the fifth position P5 and the sixth position P6, e.g. a tenth position P10, and the thickness may decrease from a position between the fifth position P5 and the sixth position P6, e.g. the tenth position P10, to the sixth position P6.

Figure 6A:
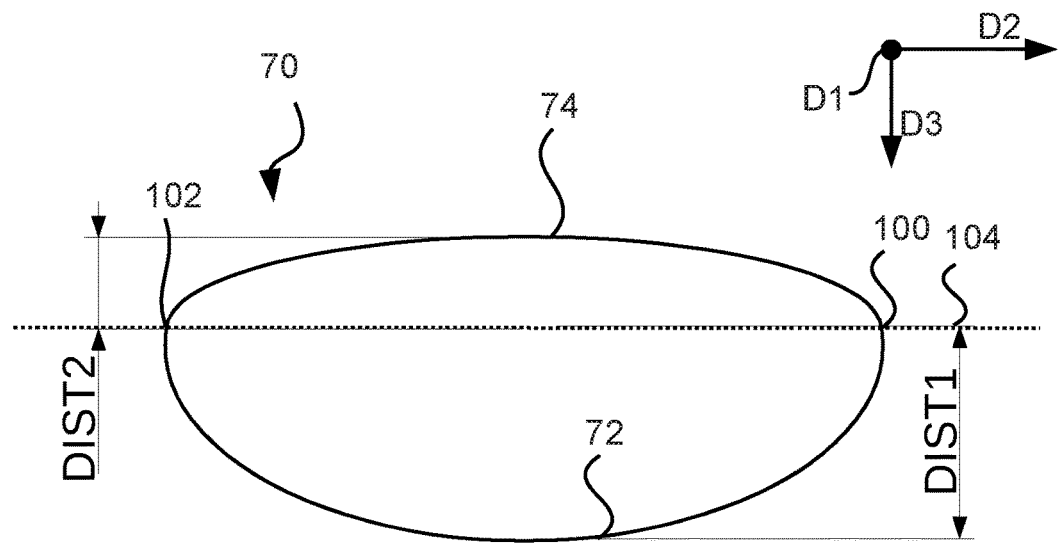
FIGS. 6a-6b are schematic diagrams illustrating an exemplary noise reduction element.
Figure 6B:
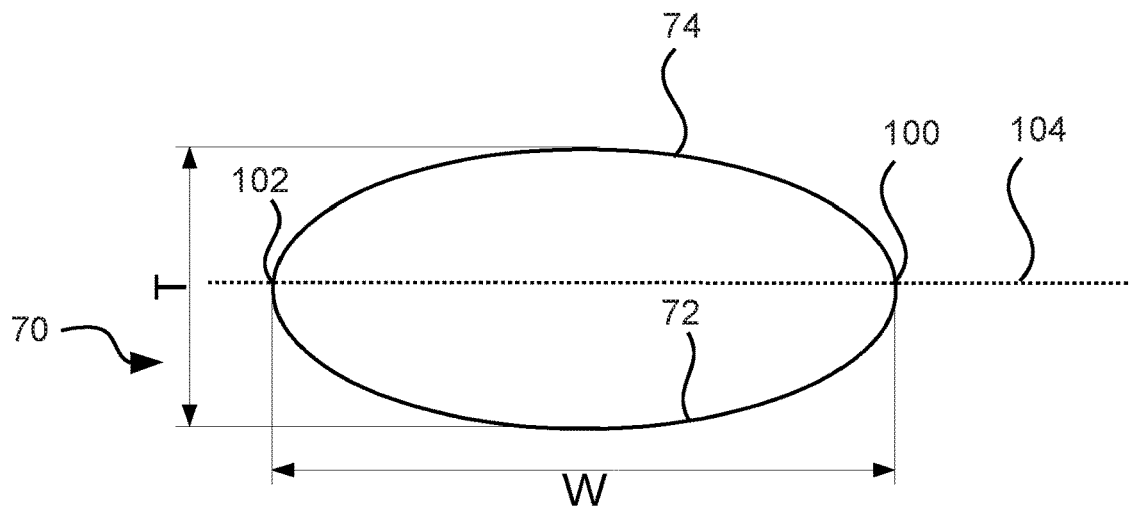

The width of the first serration part 76 may be larger than the thickness of the first serration part 76 between the first position P1 and a seventh position P7, e.g. the cross-section of the first serration part between the first position P1 and the seventh position P7 may have an elliptical shape (see FIG. 6b). The seventh position P7 may be the second position P2.

Figure 6C:
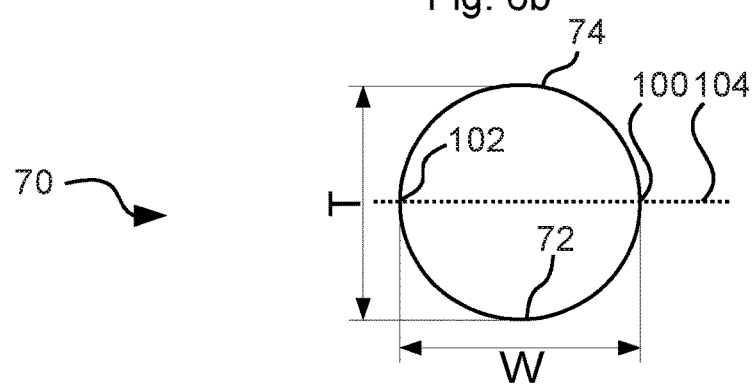

The width of the first serration part 76 may be the same as the thickness of the first serration part 76 between an eighth position P8 and the second end 54, e.g. the cross-section of the first serration part between the eighth position P8 and the second end 54 may have a circular shape (see FIG. 6c). The eight position P8 may be the second position P2.

The noise reduction element 48, 50 may comprise a conductive path 65 at the base part 60 extending along the second direction D2 and electrically connected to the first serration part 70, e.g. to the internal conductor 66 of the first serration part 70. The conductive path 65 may be configured to conduct lightning current to ground.

A second noise reduction element 90, e.g. as also illustrated in FIG. 2, may comprise a second conductive path 95.

The lightning current may be conducted towards the root of the wind turbine blade and to the ground via the conductive paths, e.g. via the first conductive path 65 to the second conductive path 95, etc. The conductive path 65 of the first noise reduction element 50 and the second conductive path 95 of the second noise reduction element 90 may be separated by a distance SD to facilitate a spark gap.

All the details described in relation to the first serration part 70 may be applicable to any serration part, such as the second serration part 80, of the noise reduction element 48, 50 in FIG. 5 and all following figures.

FIGS. 6a-6c are schematic diagrams illustrating cross-sections of an exemplary serration part of a noise reduction element, such as the first serration part 70 or the second serration part of FIG. 5. The first serration part 70 has a thickness T in the third direction D3 and a width W in the second direction D2. The first serration part 70 comprises a serration pressure surface 72 and a serration suction surface 74, which intersects at a first intersection 100 and a second intersection 102. A plane 104 extends between the first intersection 100 and the second intersection 102.

FIG. 6a illustrates that, at a ninth position P9 (see FIG. 5) along the first direction D1, a maximum distance DIST1 along the third direction D3 between the serration pressure surface 72 and the plane 104 between the first intersection 100 and the second intersection 102 is different, e.g. larger, than a maximum distance DIST2 along the third direction D3 between the serration suction surface 74 and the plane 104 between the first intersection 100 and the second intersection 102.

As described above for FIG. 5., the width W of the first serration part 70 may be larger than the thickness of the first serration part 70 between the first position P1 and a seventh position P7, e.g. the cross-section of the first serration part between the first position P1 and the seventh position P7 may have an elliptical shape, as illustrated in FIG. 6b. The seventh position P7 may be the second position P2.

The width W of the first serration part 70 may be the same as the thickness T of the first serration part 70 between an eighth position P8 and the second end 54, e.g. the cross-section of the first serration part between the eighth position P8 and the second end 54 may have a circular shape, as illustrated in FIG. 6c.

Figure 7:
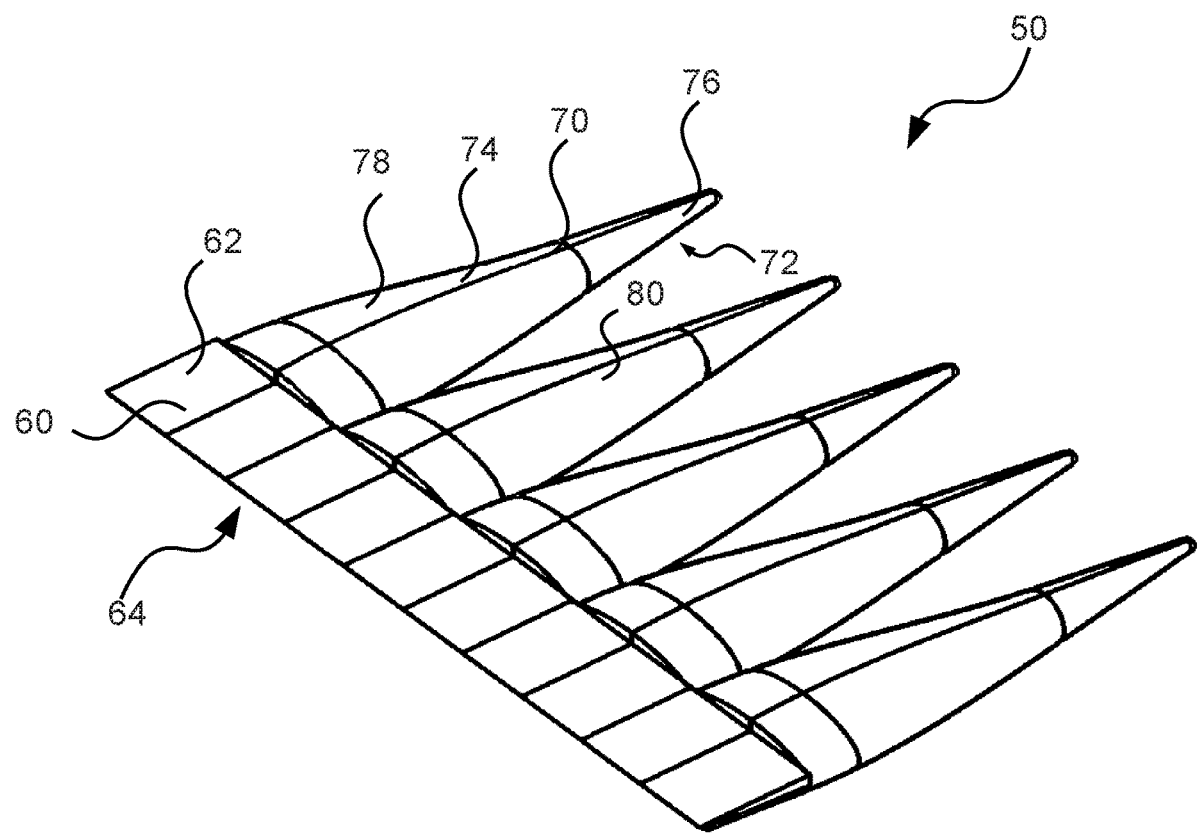
FIG. 7 is a schematic diagram illustrating an exemplary noise reduction element.

FIG. 7 is a schematic diagram illustrating a noise reduction element 50, such as the noise reduction element of FIG. 5. The noise reduction element 50 comprises a base part 60. The base part 60 comprises a first base part surface 62 and a second base part surface 64. The noise reduction element 50 comprises a first serration part 70. The first serration part 70 comprises a serration pressure surface 72 and a serration suction surface 74. The first serration part 70 comprises a serration tip part 76 and a serration root part 78. The serration tip part 76 may be shaped as a cone. The noise reduction element 50 may comprise a plurality of serration parts, including the first serration part 70 and a second serration part 80.

The thickness between the first base part surface 62 and the second base part surface 64 decreases along the first direction D1 towards the first end 52, e.g. the cross-section of the base part 60 is tapered. The first base part surface 62 and the serration suction surface 74 are adjoined, and the second base part 64 surface and the serration pressure surface 72 are adjoined.

Figure 8:
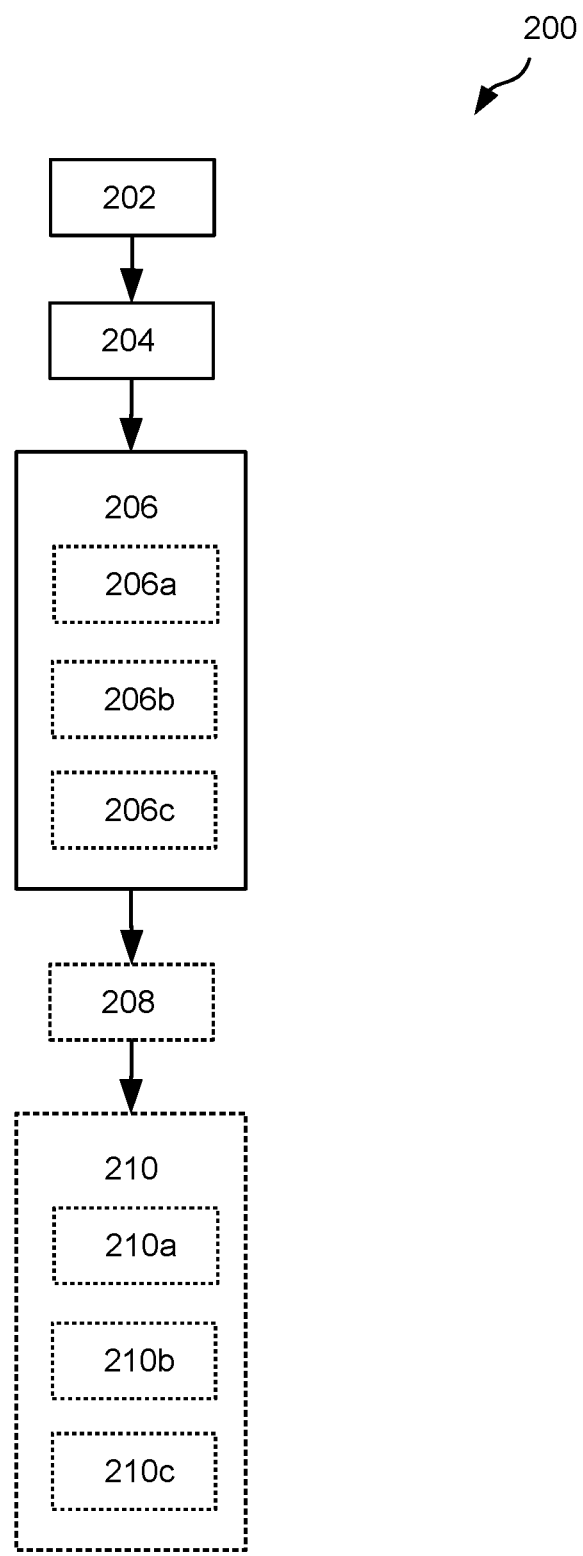
FIG. 8 is a block diagram of an exemplary method.

FIG. 8 is a block diagram of an exemplary method 200 for protecting a wind turbine blade and reducing noise caused by the operation of a wind turbine comprising the wind turbine blade.

The method 200 comprises providing 202 a wind turbine blade, such as the wind turbine blade 10 of FIGS. 1-3. The method 200 comprises providing 204 a first noise reduction element, such as the noise reduction element 48, 50 of FIGS. 2-7. The method 200 comprises attaching 206 the first noise reduction element to the trailing edge of the wind turbine blade, e.g. to a first portion of the trailing edge of the wind turbine blade.

Attaching 206 the first noise reduction element may comprise attaching 206a the first base part surface of the first noise reduction element to the wind turbine blade, such as to a surface of the wind turbine blade. Attaching 206 may also comprise applying 206b an adhesive between the first base part surface and the surface of the wind turbine blade, e.g. applying adhesive on the first base part surface and/or on the portion of the trailing edge and/or the surface of the wind turbine blade. Attaching 206 may comprise attaching 206c the first base part surface to the pressure side of the wind turbine blade.

The method 200 may comprise providing 208 a second noise reduction element, such as the noise reduction element of FIGS. 2-7. The method 200 may comprise attaching 210 the second noise reduction element to the trailing edge of the wind turbine blade, e.g. to a second portion of the trailing edge of the wind turbine blade.

Attaching 210 the second noise reduction element may comprise attaching 210a the first base part surface of the second noise reduction element to the wind turbine blade, such as to a surface of the wind turbine blade. Attaching 210 may also comprise applying 210b an adhesive between the first base part surface and the surface of the wind turbine blade, e.g. applying adhesive on the first base part surface and/or on the second portion of the trailing edge and/or the surface of the wind turbine blade. Attaching 210 may comprise attaching 210c the first base part surface to the pressure side of the wind turbine blade.

The steps 204-206 and/or 208-210 may be repeated for additional noise reduction elements.

Although the steps 204-206 and steps 208-210 are illustrated sequentially, they may be performed simultaneously. For example, the first noise reduction element may be provided 204 at the same time as the second noise reduction element is provided 208. The first noise reduction element may be attached 206 at the same time as the second noise reduction element is attached 210. Alternatively, the first noise reduction element may be attached 206 while the second noise reduction element is provided 208.

The invention has been described with reference to preferred embodiments. However, the scope of the invention is not limited to the illustrated embodiments, and alterations and modifications can be carried out without deviating from the scope of the invention.

LIST OF REFERENCES 2 wind turbine
4 tower
6 nacelle
8 hub
10 blade
14 blade tip
15 tip end
16 blade root
17 root end
18 leading edge
20 trailing edge
24 first blade shell part (pressure side)
26 second blade shell part (suction side)
28 bond lines/glue joints
30 root region
32 transition region
34 airfoil region
34a first airfoil region
34b second airfoil region
36 first shell part flange
38 second shell part flange
40 shoulder
42 shear web or spar side
46 down conductor
48 noise reduction element
50 first noise reduction element
52 first end
54 second end
56 third end
58 fourth end
60 base part
62 first base part surface
64 second base part surface
65 conductive path
66 internal conductor
68 serration part
70 first serration part
72 serration pressure surface
74 serration suction surface
76 serration tip part
78 serration root part
80 second serration part
90 second noise reduction element
95 second conductive path
100 first intersection
102 second intersection
104 plane
110 wind turbine blade assembly
P1 first position
P2 second position
P3 third position
P4 fourth position
P5 fifth position
P6 sixth position
P7 seventh position
P8 eighth position
P9 ninth position
D1 first direction
D2 second direction
D3 third direction
SD separation distance
W serration width
T serration thickness
DIST1 distance to serration pressure surface
DIST2 distance to serration suction surface
200 method
202 providing wind turbine blade
204 providing first noise reduction element
206 attaching first noise reduction element
206a attaching first base part surface
206b applying adhesive
206c attaching to pressure side
208 providing second noise reduction element
210 attaching second noise reduction element
210a attaching first base part surface
210b applying adhesive
210c attaching to pressure side

The invention claimed is:

1. A noise reduction element for a wind turbine blade, the noise reduction element extending between a first end and a second end in a first direction, and the noise reduction element extending between a third end and a fourth end in a second direction perpendicular to the first direction, the noise reduction element comprising:
a base part configured to be attached to the wind turbine blade, the base part having a first base part surface and a second base part surface and extending between the first end and a first position in the first direction; and
a first serration part extending in the first direction from the first position to the second end and comprising a serration pressure surface and a serration suction surface, the first serration part having a thickness in a third direction between the serration pressure surface and the serration suction surface, wherein the thickness of the first serration part varies along the first direction, the first serration part having a width in the second direction between a first intersection between the serration pressure surface and the serration suction surface and a second intersection between the serration pressure surface and the serration suction surface, and
wherein at least part of the first serration part is electrically conductive and configured to attract and conduct lightning current to ground.

2. The noise reduction element according to claim 1, wherein the first serration part comprises a serration tip part extending in the first direction between a second position and the second end, and the first serration part comprising a serration root part extending in the first direction from the first position to the second position.

3. The noise reduction element according to claim 1, wherein at least part of the first serration part, such as a serration tip part, is formed from an electrically conductive material, such as graphite or metal.

4. The noise reduction element according to claim 1, wherein at least a portion of the first serration part, such as a serration root part, is hollow.

5. The noise reduction element according to claim 1, wherein the first serration part comprises an internal conductor extending in the first direction and configured to conduct lightning current through at least a portion of the first serration part, such as through a serration root part.

6. The noise reduction element according to claim 1, wherein the width of the first serration part decreases from a third position to a fourth position along the first direction.

7. The noise reduction element according to claim 1, wherein the thickness of the first serration part decreases from a fifth position to a sixth position along the first direction.

8. The noise reduction element according to claim 1, wherein the width of the first serration part is larger than the thickness of the first serration part between the first position and a seventh position.

9. The noise reduction element according to claim 1, wherein the width of the first serration part is the same as the thickness of the first serration part between an eighth position and the second end.

10. The noise reduction element according to claim 1, wherein, at a ninth position along the first direction, a maximum distance along the third direction between the serration pressure surface and a plane between the first intersection and the second intersection is different.

11. The noise reduction element according to claim 1, wherein the thickness between the first base part surface and the second base part surface decreases along the first direction towards the first end.

12. The noise reduction element according to claim 1, wherein the noise reduction element comprises a plurality of serration parts, including the first serration part and a second serration part, wherein the second serration part extends in the first direction between the first position and the second end and comprising a serration pressure surface and a serration suction surface, the second serration part having a thickness in the third direction between the serration pressure surface and the serration suction surface of the second serration part, and the second serration part having a width in the second direction between a first intersection between the serration pressure surface and the serration suction surface of the second serration part and a second intersection between the serration pressure surface and the serration suction surface of the second serration part.

13. A wind turbine blade assembly comprising:
a wind turbine blade extending in a longitudinal direction from a blade tip to a blade root and having a pressure side, a suction side, a leading edge and a trailing edge; and
a first noise reduction element extending beyond the trailing edge of the wind turbine blade, the first noise reduction element extending between a first end and a second end in a first direction, and the first noise reduction element extending between a third end and a fourth end in a second direction perpendicular to the first direction, the first noise reduction element comprising:
a base part being attached to the wind turbine blade, the base part having a first base part surface and a second base part surface and extending between the first end and a first position in the first direction; and
a first serration part extending in the first direction from the first position to the second end and comprising a serration pressure surface and a serration suction surface, the first serration part having a thickness in a third direction between the serration pressure surface and the serration suction surface, wherein the thickness of the first serration part varies along the first direction, the first serration part having a width in the second direction between a first intersection between the serration pressure surface and the serration suction surface and a second intersection between the serration pressure surface and the serration suction surface,
wherein at least a part of the first serration part is electrically conductive and configured to attract and conduct lightning current to ground.

14. The wind turbine blade assembly according to claim 13, wherein the first serration part is connected to a down conductor of the wind turbine blade configured to conduct lightning current to ground.

15. The wind turbine blade assembly according to claim 13, wherein the base part of the first noise reduction element comprises a conductive path extending along the second direction and being electrically connected to the first serration part, the conductive path being configured to conduct lightning current to ground.

16. The wind turbine blade assembly according to claim 13, comprising a plurality of noise reduction elements, including the first noise reduction element and a second noise reduction element, the plurality of noise reduction elements being distributed along the trailing edge of the wind turbine blade.

17. The wind turbine blade assembly according to claim 13, wherein the plurality of noise reduction elements are distributed between 20-80% of the length of the trailing edge starting from the tip.

18. A method for lightning protecting a wind turbine blade and reducing noise caused by operation of a wind turbine comprising the wind turbine blade, the method comprising:
providing the wind turbine blade extending in a longitudinal direction from a blade root to a blade tip and having a pressure side, a suction side, a leading edge and a trailing edge;
providing a first noise reduction element extending between a first end and a second end in a first direction, and the first noise reduction element extending between a third end and a fourth end in a second direction perpendicular to the first direction, the first noise reduction element comprising:
a base part having a first base part surface and a second base part surface and extending between the first end and a first position in the first direction,
a first serration part extending in the first direction from the first position to the second end and comprising a serration pressure surface and a serration suction surface, the first serration part having a thickness in a third direction between the serration pressure surface and the serration suction surface, wherein the thickness of the first serration part varies along the first direction, the first serration part having a width in the second direction between a first intersection between the serration pressure surface and the serration suction surface and a second intersection between the serration pressure surface and the serration suction surface, and wherein at least a part of the first serration part is electrically conductive and configured to attract and conduct lightning to ground; and attaching the first noise reduction element to the trailing edge of the wind turbine blade.

19. The method according to claim 18, wherein attaching the first noise reduction element comprises attaching the first base part surface to a surface of the wind turbine blade.

20. The method according to claim 19, wherein attaching the first noise reduction element comprises applying an adhesive between the first base part surface and the surface of the wind turbine blade.

\* \* \* \* \*